US012734930B2

(12) United States Patent
Li

(10) Patent No.: US 12,734,930 B2
(45) Date of Patent: Sep. 15, 2026

(54) POWER FREELY-CONFIGURABLE PLUG-IN BATTERY PACK, VEHICLE, AND BATTERY REPLACEMENT METHOD

(71) Applicant: ZHEJIANG GEELY HOLDING GROUP CO., LTD., Hangzhou (CN)

(72) Inventor: Shufu Li, Hangzhou (CN)

(73) Assignee: ZHEJIANG GEELY HOLDING GROUP CO., LTD., Hangzhou (CN)

( * ) Notice: Subject to any disclaimer, the term of this patent is extended or adjusted under 35 U.S.C. 154(b) by 222 days.

(21) Appl. No.: 18/444,960

(22) Filed: Feb. 19, 2024

(65) Prior Publication Data

US 2024/0190287 A1 Jun. 13, 2024

Related U.S. Application Data

(63) Continuation of application No. PCT/CN2022/112688, filed on Aug. 16, 2022.

(30) Foreign Application Priority Data

Aug. 20, 2021 (CN) ........................ 202110960782.3

(51) Int. Cl.
*B60L 50/64* (2019.01)
*B60L 53/80* (2019.01)
(Continued)

(52) U.S. Cl.
CPC ........... *B60L 53/80* (2019.02); *H01M 10/482* (2013.01); *H01M 50/264* (2021.01);
(Continued)

(58) Field of Classification Search
CPC ............. H01M 50/489; H01M 10/425; H01M 50/471; H01M 50/284; H01M 50/264;
(Continued)

(56) References Cited

U.S. PATENT DOCUMENTS 7,989,104 B2 * 8/2011 Jeon .................. H01M 10/0472 429/159
10,023,069 B2 7/2018 Kobayashi et al.
(Continued)

FOREIGN PATENT DOCUMENTS

CN 102165625 A * 8/2011 ............ H01M 50/24
CN 102165625 B 11/2015
(Continued)

OTHER PUBLICATIONS

International Search Report and Written Opinion issued in corresponding PCT Application No. PCT/CN2022/112688, dated Nov. 16, 2022.

(Continued)

*Primary Examiner* — Stacey A Fluhart
(74) *Attorney, Agent, or Firm* — Westbridge IP LLC

(57) ABSTRACT

Disclosed are a power freely-configurable plug-in battery pack, a vehicle, and a battery replacement method. The battery pack includes an installation box provided with a plurality of cell channels; a cell module pluggably installed in the cell channel, where a cell quick-replacement connector is provided between the cell module and the cell channel; and a controller, where the controller is electrically connected to the cell module through the cell quick-replacement connector and controls an operation of the cell module. The present application provides the cell channel in the battery pack and provides the cell quick-replacement connector, so that the cell module can be quickly plugged and unplugged relative to the cell channel, realizing the quick replacement of the cell module and improving the replacing efficiency of the battery pack.

18 Claims, 11 Drawing Sheets

(51) Int. Cl.
*H01M 10/48* (2006.01)
*H01M 50/264* (2021.01)
*B60K 1/04* (2019.01)

(52) U.S. Cl.
CPC ................. *B60K 2001/0411* (2013.01); *B60K 2001/0416* (2013.01); *B60K 2001/0438* (2013.01); *B60K 2001/0466* (2013.01); *B60K 2001/0472* (2013.01); *H01M 2220/20* (2013.01)

(58) Field of Classification Search
CPC ....... H01M 50/258; H01M 6/42; B60L 11/18; B60L 50/64; B60L 50/66
See application file for complete search history.

(56) References Cited

U.S. PATENT DOCUMENTS

| | | | | |
|---|---|---|---|---|
| 10,811,646 | B2 * | 10/2020 | Meyers | H01M 50/204 |
| 10,847,771 | B2 | 11/2020 | Goitsuka et al. | |
| 11,104,231 | B2 * | 8/2021 | Froelich | B60L 58/21 |
| 2002/0012833 | A1 * | 1/2002 | Gow | H01M 10/647 429/149 |
| 2015/0298573 | A1 | 10/2015 | Froelich | |
| 2017/0125852 | A1 | 5/2017 | Zhuang et al. | |
| 2023/0027399 | A1 * | 1/2023 | Wiegman | B60L 58/26 |
| 2024/0055693 | A1 * | 2/2024 | Zhou | H01M 10/654 |
| 2025/0132443 | A1 * | 4/2025 | Fairbanks | B60L 58/22 |

FOREIGN PATENT DOCUMENTS

| | | | | |
|---|---|---|---|---|
| CN | 206690863 | U | 12/2017 | |
| CN | 108749785 | A | 11/2018 | |
| CN | 111746255 | A | 10/2020 | |
| CN | 212257481 | U | 12/2020 | |
| CN | 213483895 | U | 6/2021 | |
| CN | 216648500 | U | 5/2022 | |
| DE | 102012212869 | A1 * | 1/2013 | B60L 50/16 |
| WO | 2018076849 | A1 | 5/2018 | |

OTHER PUBLICATIONS

Extended European Search Report issued in counterpart European Patent Application No. 22857776.3, dated May 19, 2025.
Communication about intention to grant a European patent issued in counterpart European Patent Application No. EP 22857776.3, dated Mar. 23, 2026.
First Office Action issued in counterpart Chinese Patent Application No. 202110960782.3, dated Apr. 17, 2026.

* cited by examiner

POWER FREELY-CONFIGURABLE PLUG-IN BATTERY PACK, VEHICLE, AND BATTERY REPLACEMENT METHOD

CROSS-REFERENCE TO RELATED APPLICATIONS

This application is a continuation application of International Application No. PCT/CN2022/112688, filed on Aug. 16, 2022, which claims priority to Chinese Patent Application No. 202110960782.3, filed on Aug. 20, 2021. The disclosures of the above-mentioned applications are incorporated herein by reference in their entireties.

TECHNICAL FIELD

The present application relates to the technical field of car range, and in particular to a power freely-configurable plug-in battery pack, a vehicle, and a battery replacement method.

BACKGROUND

In recent years, electrification has been a development trend in the automobile industry, and driving range is a key issue in the development of electric vehicles. However, due to the influence of battery energy density, the driving range of electric vehicles is relatively short, and range anxiety troubles consumers, which in turn affects their willingness to purchase electric vehicles to a certain extent, and also indirectly affects the electrification development of the automobile market.

After market research, end users generally have two typical ways of using cars. The first is daily commuting, which takes up most of the time, and the daily driving distance is short; the second is long-distance driving. Vehicles with short daily driving distances cannot support users on long-distance driving, while vehicles with long driving range have extra weight of battery packs and hybrid components, which are redundant and burdensome when commuting, resulting in poor user experience. However, when the battery pack is currently replaced to meet different driving ranges, the battery pack replacement method is single, the replacement cost is high, the replacement location is limited, and the replacing efficiency is low.

SUMMARY

The technical problem to be solved by the present application is that the battery pack replacing efficiency of the related art is low and the contradiction between the driving range and the load weight cannot be considered in both short-distance driving and long-distance driving scenarios.

In order to achieve the above technical problems, the present application provides a power freely-configurable plug-in battery pack, a vehicle and a battery replacement method.

According to an aspect of the present application, a power freely-configurable plug-in battery pack is provided, the battery pack is provided on the vehicle, and the battery pack includes: an installation box, a cell module, and a controller.

A plurality of cell channels are provided in the installation box.

The cell module is pluggably installed in the cell channel, and a cell quick-replacement connector is provided between the cell module and the cell channel.

The controller is electrically connected to the cell module through the cell quick-replacement connector and controls the operation of the cell module.

According to another aspect of the present application, a battery pack power freely-configurable vehicle is provided. The above-mentioned power freely-configurable plug-in battery pack is provided at a bottom of the vehicle. The cell channel is provided at a lower part of the battery pack and provided with an opening downward, and the cell module is inserted vertically upward in the cell channel.

According to another aspect of the present application, another battery pack power freely-configurable vehicle is provided. The above-mentioned power freely-configurable plug-in battery pack is provided at a bottom of the vehicle. The battery pack and the vehicle are connected through the body quick-replacement connector, and the cell channel is provided at a lower part of the battery pack and provided with an opening downward, and the cell module is inserted vertically upward in the cell channel.

According to another aspect of the present application, another battery pack power freely-configurable vehicle is provided. The above-mentioned power freely-configurable plug-in battery pack is provided in a trunk of the vehicle. The cell channel is provided horizontally, and the cell module is inserted horizontally in the cell channel.

According to another aspect of the present application, another battery pack power freely-configurable vehicle is provided. The above-mentioned power freely-configurable plug-in battery pack is provided in a front of the vehicle. The cell channel is provided on an upper part of the battery pack and provided with an opening vertically upward, and the cell module is inserted vertically downward in the cell channel.

In an embodiment, a partition is formed between the two cell channels. The partition is provided with a flow channel, and wiring harnesses and/or pipelines are provided in the flow channel.

In an embodiment, the installation box is further provided with a locking mechanism, and the locking mechanism is configured to limit and lock the cell module in the cell channel or to release and unlock of the cell module in the cell channel.

In an embodiment, the locking mechanism is provided on the partition.

In an embodiment, the cell channel is configured as a slot structure, and a bottom of the slot structure is provided close to the controller.

In an embodiment, a dragging mechanism is provided in each cell channel. The dragging mechanism is configured to drag the cell module, and the cell module is detachably installed in the cell channel through the dragging mechanism.

In an embodiment, the dragging mechanism is provided with a pull-out piece.

In an embodiment, the vehicle further comprises a voltage-to-current converter electrically connected to the battery pack and a motor of the vehicle respectively.

In an embodiment, wherein the vehicle is a new energy vehicle, and comprises an electric vehicle (EV), a battery electric vehicle (BEV), and a hybrid electric vehicle (HEV).

According to another aspect of the present application, a battery replacement method for a vehicle with a power freely-configurable plug-in battery pack is provided. The method is applied to the above-mentioned battery pack power freely-configurable vehicle, the above-mentioned power freely-configurable plug-in battery pack is provided at the bottom of the vehicle, the cell channel is provided at a lower part of the battery pack with an opening downward, and the cell module is inserted vertically upward in the cell channel.

The method includes:

in response to a current power of the battery pack being lower than a first power threshold, determining a target cell module, wherein a power of the battery pack in the target cell module is lower than a second power threshold and the second power threshold is less than or equal to the first power threshold;

replacing the target cell module based on the cell quick-replacement connector between the cell module and the cell channel, wherein a replacement cell module of the target cell module is inserted in a vertically upward direction.

According to another aspect of the present application, another battery replacement method for a vehicle with a power freely-configurable plug-in battery pack is provided. The method is applied to the above-mentioned battery pack power freely-configurable vehicle, the above-mentioned power freely-configurable plug-in battery pack is provided at the bottom of the vehicle, the cell channel is provided at a lower part of the battery pack with an opening downward, and the cell module is inserted vertically upward in the cell channel.

The method includes:

in response to a current power of the battery pack being lower than a first power threshold, replacing an entire battery pack based on the body quick-replacement connector between the battery pack and the vehicle;

or, in response to a current power of the battery pack being lower than a first power threshold, determining a target cell module, wherein a power of the battery pack in the target cell module is lower than a second power threshold and the second power threshold is less than or equal to the first power threshold;

replacing the target cell module based on the cell quick-replacement connector between the cell module and the cell channel, wherein a replacement cell module of the target cell module is inserted in a vertically upward direction.

According to another aspect of the present application, another battery replacement method for a vehicle with a power freely-configurable plug-in battery pack is provided. The method is applied to the above-mentioned battery pack power freely-configurable vehicle, the above-mentioned power freely-configurable plug-in battery pack is provided in the trunk of the vehicle. The cell channel is provided horizontally, and the cell module is inserted horizontally in the cell channel.

The method includes:

in response to a current power of the battery pack being lower than a first power threshold, determining a target cell module, wherein a power of the battery pack in the target cell module is lower than a second power threshold and the second power threshold is less than or equal to the first power threshold;

replacing the target cell module based on the cell quick-replacement connector between the cell module and the cell channel, wherein a replacement cell module of the target cell module is inserted in a horizontal direction.

According to another aspect of the present application, another battery replacement method for a vehicle with a power freely-configurable plug-in battery pack is provided. The method is applied to the above-mentioned battery pack power freely-configurable vehicle, the above-mentioned power freely-configurable plug-in battery pack is provided in a front of the vehicle. The cell channel is provided on an upper part of the battery pack and provided with an opening vertically upward, and the cell module is inserted vertically downward in the cell channel.

The method includes:

in response to a current power of the battery pack being lower than a first power threshold, determining a target cell module, wherein a power of the battery pack in the target cell module is lower than a second power threshold and the second power threshold is less than or equal to the first power threshold;

replacing the target cell module based on the cell quick-replacement connector between the cell module and the cell channel, wherein a replacement cell module of the target cell module is inserted in a vertically downward direction.

In the present application, the cell channel is provided in the battery pack and the cell quick-replacement connector is provided, so that the cell module can be quickly plugged and unplugged relative to the cell channel, realizing the quick replacement of the cell module and improving the replacing efficiency of the battery pack. In addition, in the present application, when replacing the battery pack on the vehicle, the replacement method of the battery pack can be adaptively selected, and the battery pack can be adaptively added or uninstalled according to the driving range, so as to meet the driving range while reducing the weight of the vehicle and improving user experience.

BRIEF DESCRIPTION OF THE DRAWINGS

In order to more clearly illustrate the technical solutions in the embodiments of the present application or related art, the following is a brief description of the drawings for the description of the embodiments or related art, it is obvious that the drawings in the following description are only some of the embodiments of the present application, other structures may be obtained by those skilled in the art according to structures in these drawings without creative works.

DETAILED DESCRIPTION OF THE EMBODIMENTS

Figure 1:
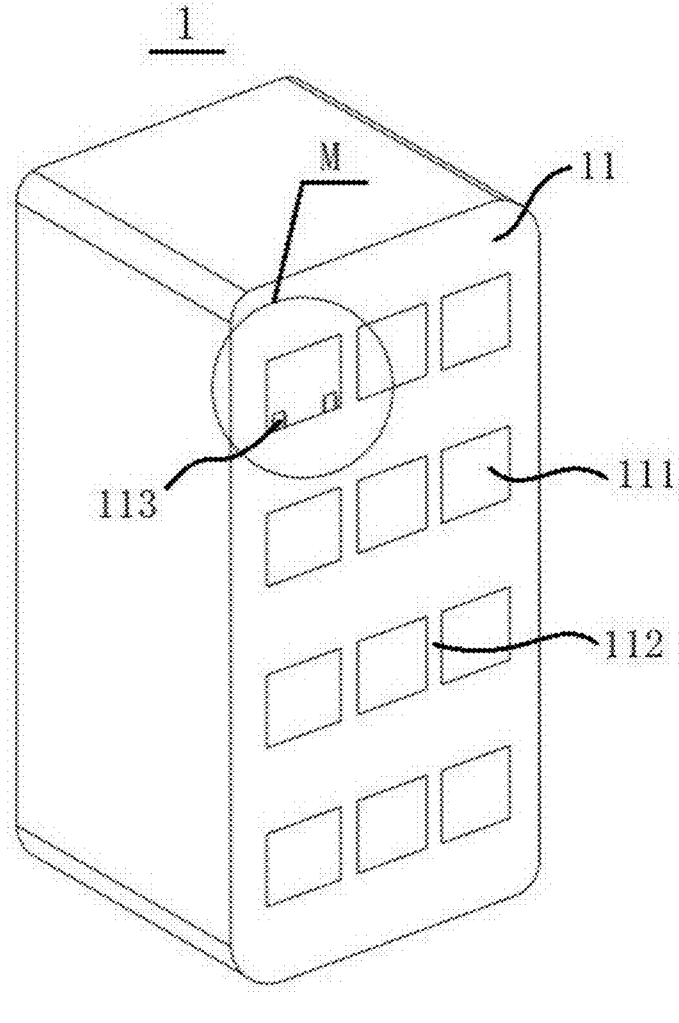
FIG. 1 is a schematic structural diagram of a power freely-configurable plug-in battery pack provided by an embodiment of the present application from an angle.

In order to make those skilled in the art to better understand the solutions of the present application, the technical solutions in the embodiments of the present application will be clearly and completely described below in conjunction with the accompanying drawings in the embodiments of the present application. Obviously, the described embodiments are only part of embodiments of the present application, rather than all embodiments. Based on the embodiments of the present application, all other embodiments obtained by those of ordinary skill in the art without creative efforts should fall within the scope of the present application.

Reference herein to "one embodiment" or "an embodiment" refers to a particular feature, structure, or characteristic that may be included in at least one implementation of the present application. In the description of the present application, it should be understood that the orientation or positional relationship indicated by the terms "up", "top", "bottom", etc. are based on the orientation or positional relationship shown in the drawings, and is only for the convenience of describing the present application and simplifying the description, instead of indicating or implying that the devices or elements referred to must have a specific orientation, be constructed and operated in a specific orientation, and therefore are not to be construed as limitations of the application. In addition, the terms "first" and "second" are used for descriptive purposes only and cannot be understood as indicating or implying relative importance or implicitly indicating the quantity of indicated technical features. Therefore, features defined as "first" and "second" may explicitly or implicitly include one or more of these features. In addition, the terms "first", "second", etc. are used to distinguish similar objects and are not necessarily used to describe a specific order or sequence. It is to be understood that the data so used are interchangeable under appropriate circumstances so that the embodiments of the application described herein are capable of being practiced in sequences other than those illustrated or described herein.

In order to solve the above technical problems, the present application provides a power freely-configurable plug-in battery pack, a vehicle, and a battery replacement method.

In an embodiment, the present application provides a power freely-configurable plug-in battery pack. The battery pack is installed on a vehicle. As shown in FIGS. 1 to 8, the battery pack 1 includes an installation box 11, a cell module 12, and a controller 13.

A plurality of cell channels 111 are provided in the installation box 11.

The cell module 12 is pluggably installed in the cell channel 111, and a cell quick-replacement connector is provided between the cell module 12 and the cell channel 111.

The controller 13 is electrically connected to the cell module 12 through the cell quick-replacement connector and is configured to control the operation of the cell module 12.

By providing the cell channel 111 in the battery pack 1 and providing the cell quick-replacement connector, the cell module 12 can be quickly plugged and unplugged relative to the cell channel 111, the cell module 12 can be quickly replaced, and the replacing efficiency of battery pack 1 is improved.

In an embodiment, the cell channel 111 is a rectangular slot structure, and is configured to install a rectangular structure cell module.

It can be understood that it is only an embodiment that the cell channel 111 is a rectangular slot structure. In other embodiments, the cell channel 111 can also be configured as a cylindrical slot structure to adapt to the cylindrical structure cell module.

In addition, the installation box 11 is further provided with a locking mechanism (not shown). The locking mechanism is configured to limit and lock the cell module 12 in the cell channel 111 or to release and unlock the cell module 12 in the cell channel 111. In an embodiment, the locking mechanism may be provided on the partition 112. The quantity of locking mechanisms can be adapted to the quantity of cell channels 111, so that after the cell modules 12 are installed in each cell channel 111, each cell module 12 is locked and fixed, preventing cell module 12 from being out of position caused by bumping during the car driving, which results in poor contact and affecting the power supply.

In another embodiment, the locking mechanism can also be provided on the installation box 11. It should be noted that when the locking mechanism is installed, it avoids the surface where the cell channel 111 is located, so as to avoid interfering the installation of the cell module 12 in the cell channel 111. In an embodiment, the cell modules 12 in each row of cell channels 111 can be configured to share a locking mechanism, or the cell modules 12 in each column of cell channels 111 can be configured to share a locking mechanism to save materials. And after the locking mechanism is locked, a larger contact area between the locking mechanism and the cell module 12 can be achieved, thereby improving the locking stability of the cell module 12.

In addition, each cell channel 111 is provided with a dragging mechanism 113. The dragging mechanism 113 is configured to drag the cell module 12. The cell module 12 can be detachably installed in the cell channel 111 through the dragging mechanism 113. By providing the dragging mechanism 113 in the cell channel 111, a drawer-type installation box 11 is provided, which realizes the detachable installation of the cell module 12 in the installation box 11, makes replacement simple and convenient, and improves the efficiency of the cell module. The overall volume of the cell module 12 is less than the overall volume of the battery pack 1. The cell module 12 can be replaced without being restricted by the replacement site and personnel, and the replacement is highly operable. In addition, the installation structure of the cell module 12 can be applied to a plurality of scenarios and has wide applicability.

For example: when the power of a certain cell module 12 is insufficient or the cell module 12 fails, the cell module 12 can be quickly replaced in situ based on the structural characteristics of the cell module 12 installation structure of the present application. The replacement location is not subject to the constraints of battery replacement stations, improving the convenience of battery replacement.

In an embodiment, when planning a trip, different quantities of cell modules 12 can be configured according to the estimated mileage. When the itinerary changes on the road, a nearby battery swap station can be selected to add or reduce the quantity of cell modules 12 to meet the driving range while reducing the overall load mass of the car.

In an embodiment, when purchasing the cell module 12 installation structure, the quantity of cell modules 12 can be freely selected by the user. During daily use, if it is needed to increase the driving range, it can be considered to purchase or lease the corresponding cell module 12 independently to save car purchase cost.

It can be further understood that in the present application, only the cell module 12 can be replaced without replacing the controller 13, so that the controller 13 can be shared by a plurality of cell modules 12, thereby saving the cost of battery replacement.

In an embodiment, the installation box 11 can be configured as a cuboid structure, and M×N cell channels 111 are provided on the cuboid structure installation box 11. M represents the quantity of rows, N represents the quantity of columns, and M≥1, N≥1. In an embodiment, as shown in FIG. 1 and FIGS. 4 to 5, M can be 3 and N can be 4, forming a cell channel 111 structure of three rows and four columns.

Figure 4:
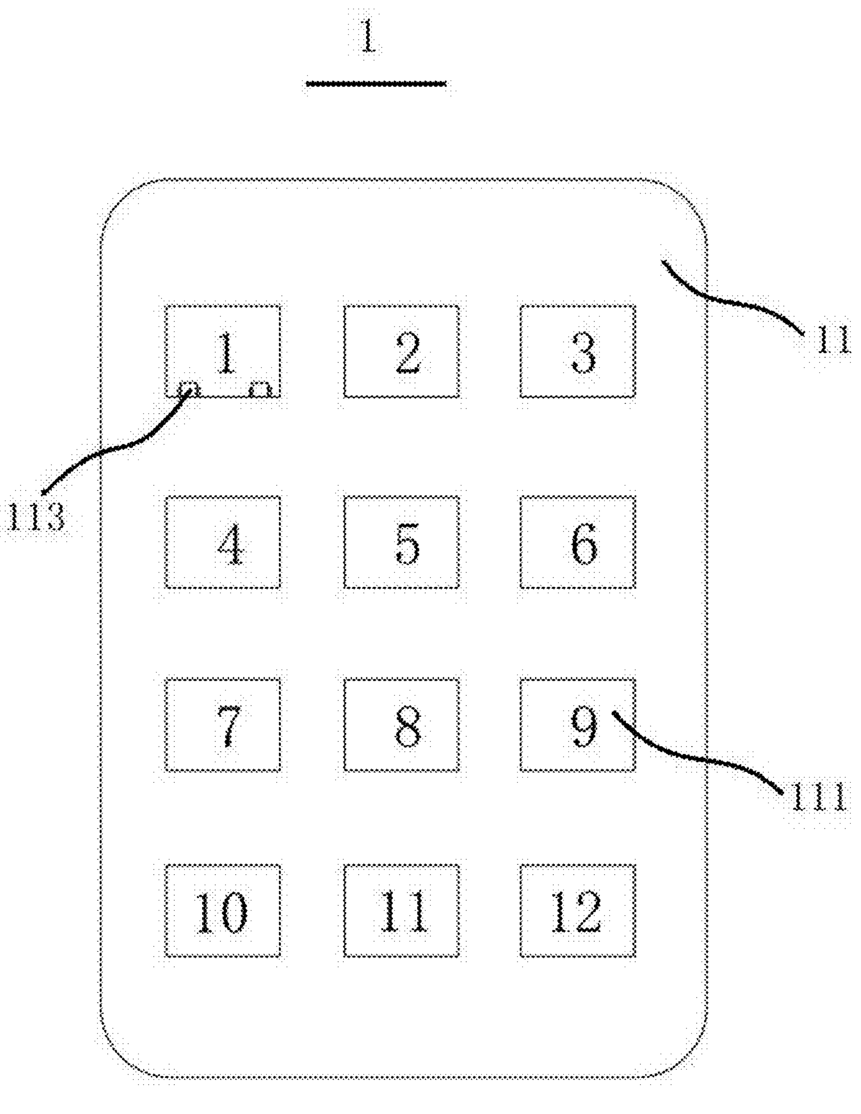
FIG. 4 is a schematic structural diagram of the power freely-configurable plug-in battery pack provided by an embodiment of the present application from another angle.
Figure 5:
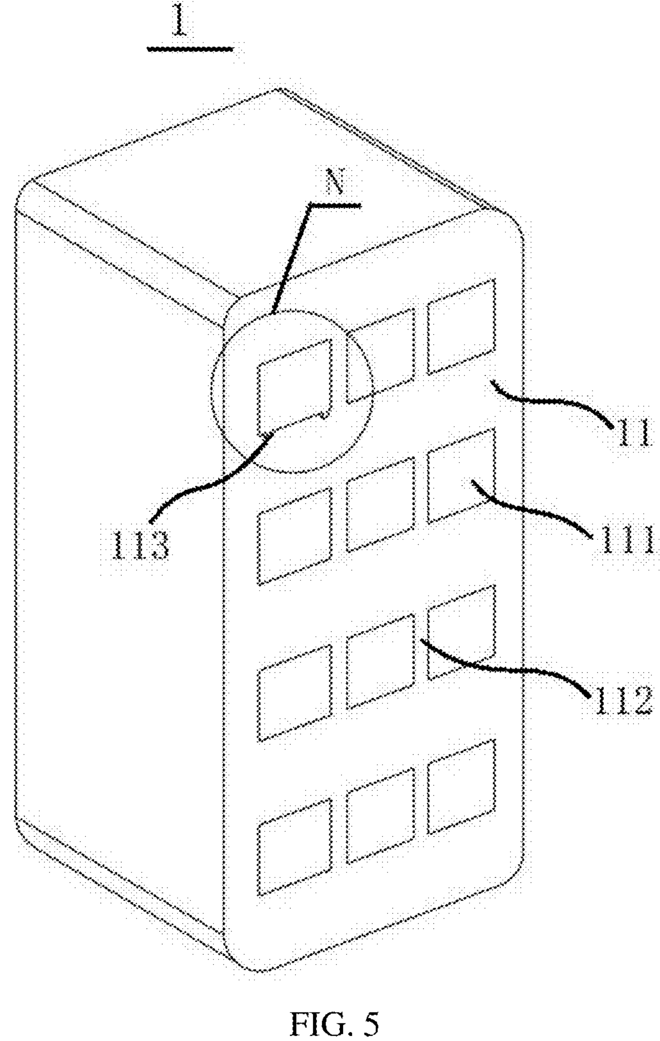
FIG. 5 is a schematic structural diagram of the power freely-configurable plug-in battery pack provided by an embodiment of the present application from another angle.

In an embodiment, as shown in FIG. 4, 12 cell channels 111 with serial numbers 1 to 12 are formed. After the cell module 12 is installed in the cell channel 111, the cell modules 12 in each row are sequentially connected in series, and the cell modules 12 in each column are connected in parallel. For example, as shown in FIG. 4, the cell modules 12 in the cell channels 111 of No. 1, 2 and 3 are sequentially connected in series, the cell modules 111 of the No. 4, 5 and 6 are sequentially connected in series, the cell modules 12 in the cell channels 111 of No. 7, 8 and 9 are sequentially connected in series, and the cell modules 12 in the cell channels 111 of No. 10, 11 and 12 are sequentially connected in series. The cell modules 12 in the cell channels 111 of No. 1, 4, 7 and 10 are connected in parallel with each other, the cell modules 12 in the cell channels 111 of No. 2, 5, 8 and 11 are connected in parallel with each other, the cell modules 12 in the cell channels 111 of No. 3, 6, 9 and 12 are connected in parallel with each other.

It can be understood that it is only an embodiment that the installation box 11 is in the cuboid structure. In other embodiments, the installation box 11 can also be configured as a cube structure, a hexahedron structure, etc., and can be configured as needed, which is not limited in detail here.

Figure 2:
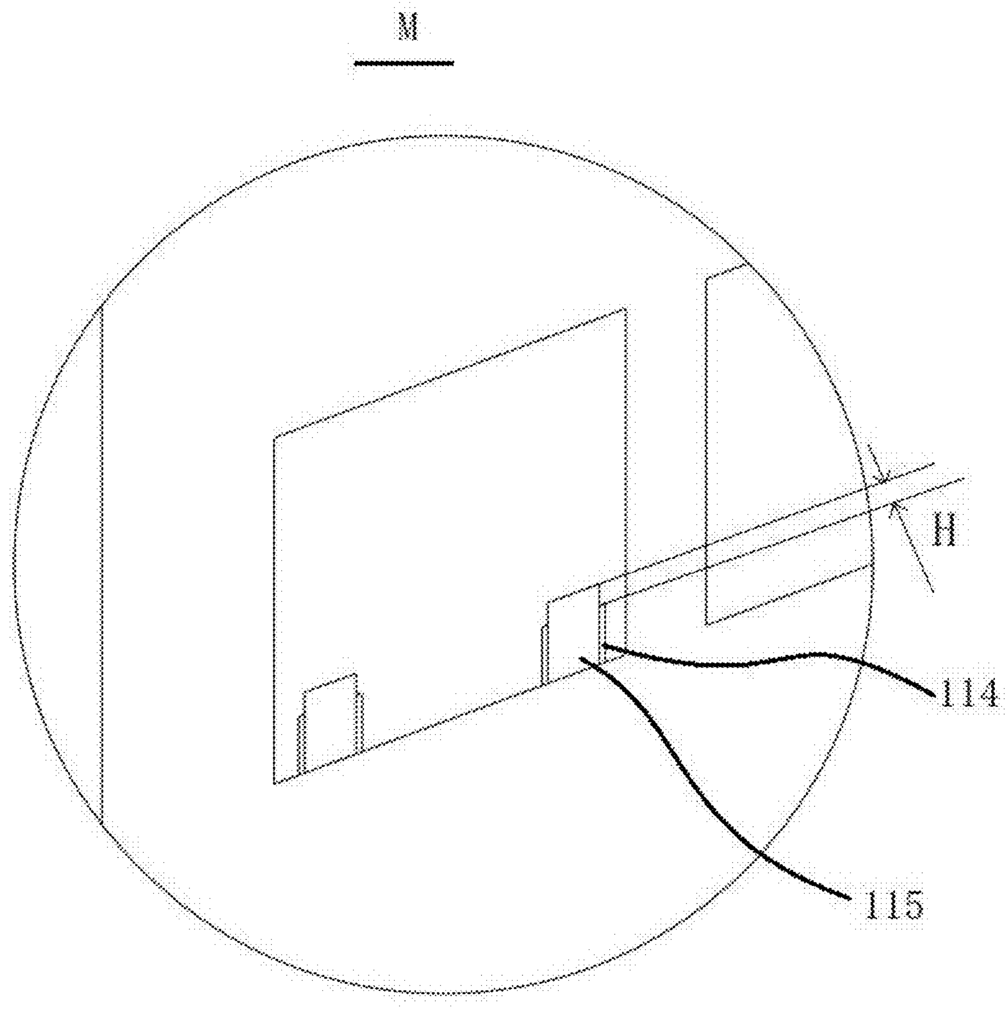
FIG. 2 is a partial enlarged view of FIG. 1.
Figure 3:
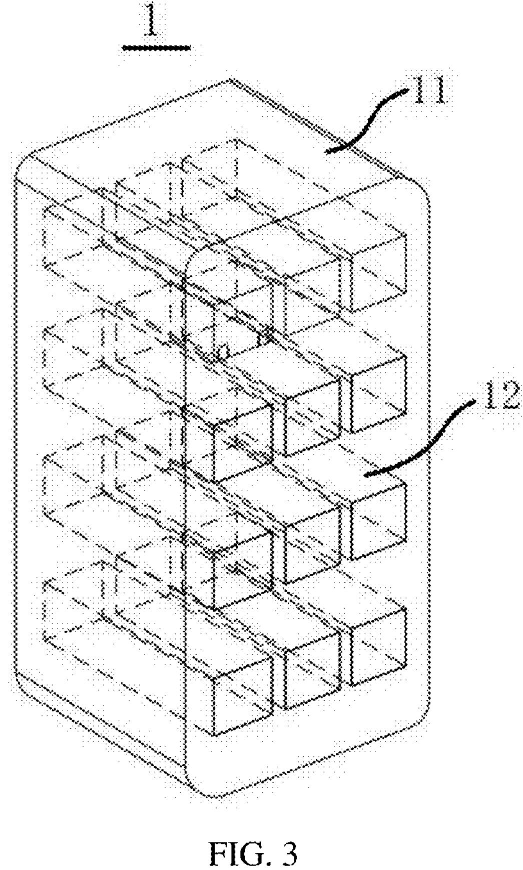
FIG. 3 is a schematic structural diagram of the power freely-configurable plug-in battery pack provided by an embodiment of the present application from another angle.

In an embodiment, as shown in FIGS. 1 and 2, the dragging mechanism 113 is slidably connected to the cell channel 111, that is, the dragging mechanism 113 is slidably provided relative to the module. In an embodiment, the dragging mechanism 113 includes a fixing slot 114 and a sliding rod 115. The fixing slot 114 is detachably connected to the cell channel 111. In an embodiment, the fixing slot 114 is provided close to the opening of the cell channel 111, the sliding rod 115 is slidably provided in the fixing slot 114, and the cell module 12 is dragged through the sliding rod 115. In an embodiment, the thickness of the sliding rod 115 is greater than the depth of the fixing slot 114, that is, as shown in FIG. 2, the sliding rod 115 protrudes beyond the height H of the fixing slot 114. By providing the sliding rod 115 to be higher than the height H of the fixing slot 114, when the cell module 12 is dragged by the sliding rod 115, the sliding rod 115 drives the cell module 12 to slide in the cell channel 111 while avoiding interfering with the fixing slot 114. It can be understood that only an exemplary structure of the dragging mechanism 113 is shown in FIGS. 1 and 2, and only shown in part of the cell channels 111. Other cell channels 111 are not shown in detail. Although not all of the dragging mechanisms 113 are shown on the cell channels 111, it should be understood that these cell channels 111 are also provided with the dragging mechanisms 113.

In an embodiment, the dragging mechanism 113 is further provided with a pull-out piece (not shown), and the pull-out piece is connected to the sliding rod 115. In an embodiment, the pull-out piece is configured as a handle, and the sliding rod 115 can slide relative to the fixing slot 114 by pushing and pulling the pull-out piece of the handle structure. By providing a pull-out piece, the replacement of the cell module 12 is facilitated.

In an embodiment, a buffer structure (not shown) is provided in the cell channel 111. In an embodiment, the buffer structure is provided on the inner wall of the cell channel 111. The buffer structure can be an insulating layer. In an embodiment, the insulating layer is further provided with cushioning cotton. It can be understood that by providing a buffer layer, it is possible to prevent direct metal contact between the cell module 12 and the inner wall of the cell channel 111 during the installation or uninstallation of the cell module 12 in the cell channel 111, which may cause wear or produce electric filed effect.

In an embodiment, after the controller 13 is electrically connected to the cell module 12 through the cell quick-replacement connector, the working status information of the cell module 12 can be monitored to perform status reminder processing of the cell module 12. In an embodiment, the working status information of the cell module 12 may include but is not limited to information such as working voltage, working current, working temperature, etc. When the controller 13 detects an abnormality in any one of the working voltages, working current and working temperature, it can send out alarm information. Thus, the driver can be reminded to take corresponding measures based on the current status of the cell module 12. For example, when the controller 13 detects that the temperature of the cell module 12 is too high, the controller 13 sends the alarm information to the driver, so that after receiving the alarm information, the driver stops and takes a rest to avoid the cell module. The temperature of cell module 12 continues to rise, which may cause danger, or the vehicle should stop and check whether the cooling system of cell module 12 is abnormal. In addition, a partition 112 is formed between the cell channel 111 and the cell channel 111. A flow channel is provided on the partition 112, and wire harnesses and/or pipelines are provided in the flow channel. It can be understood that by centrally providing the wire harnesses configured to conduct the plurality of cell modules 12 on the partition 112, the wire loss is reduced to a certain extent. The wire harness configured to manage heat of each cell module 12 is centrally provided on the partition 112, which reduces energy consumption to a certain extent compared to the pipelines provided dispersedly.

Figure 8:
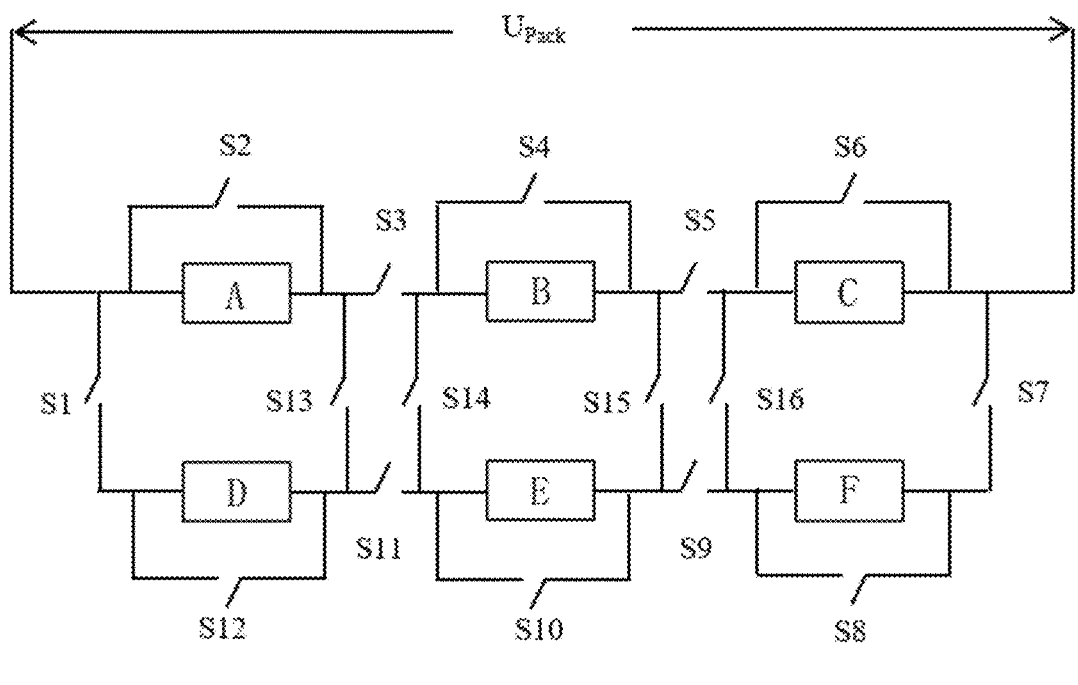
FIG. 8 is a control principle diagram of the power freely-configurable plug-in battery pack provided by an embodiment of the present application.

For example, taking the electrical schematic diagram shown in FIG. 8 as an example to illustrate the scenario (the example uses a 3*2 arrangement as an example, and the quantity of physical objects can be expanded according to the actual situation).

As shown in FIG. 8, A, B, C, D, E, and F all refer to the cell module 12, S1-S16 are switches, and the switches are controlled by the controller 13. (Metal-Oxide-Semiconductor Field-Effect Transistor (MOSFET) or other similar switches can be adopted), the controller 13 will automatically detect the working status information of each cell module 12, and determine the optimal module usage configuration and series and parallel connection based on the monitored working status information and mileage.

In response to detecting that only cell module A is available, the controller 13 controls the switches S3, S4, S5, and S6 to close, and the other switches remain open.

In response to determining that cell modules A, B, and C need to be used in series, the controller 13 controls the switches S3 and S5 to close and controls the switches S1, S2, S4, S6, S7, S8, S9, S10, S11, and S12, S13, S14, S15, S16 remain open.

In response to determining that the voltages of the two parts that need to be connected in parallel are close to the voltage threshold, the parallel mode is allowed. Otherwise, parallel connection cannot be used and the independent part must be powered. For example, when 12 cell modules A, B, and C are connected in series, and when 12 cell modules D, E, and F are connected in series, in response to that the voltage of cell modules A, B, and C being connected in series is close to the voltage of cell modules D, E, and F being connected in series, the series-connected cell modules A, B, and C are allowed to be connected in parallel with the series-connected cell modules D, E, and F, and the corresponding paths are S2, S4, S6, S13, and S14, S15, S16, S12, S10, S8 remain open, and other switches are closed. In response to that the difference between the voltage of cell modules A, B, and C being connected in series and the voltage of cell modules D, E, and F being connected in series is large, the series-connected cell modules A, B, and C are not allowed to be connected in parallel with the series-connected cell modules D, E, and F. The cell modules A, B, and C connected in series can be adopted by the system to provide power independently, or the cell modules D, E, and F connected in series can be adopted by the system to provide power independently. In an embodiment, the cell modules connected in series with a higher voltage is selected.

When the cell modules A, B, and C connected in series are adopted by the vehicle to provide power, in response to that the power of the cell module C is too low or fails during use, the series-parallel connection mode will be automatically adjusted, the cell module C is disconnected, and only the cell modules A and B are used in series. The corresponding path status is: the switches S3, S5, and S6 are closed, and switches S2, S4, S1, and S7-S16 are all open. At the same time, the controller 13 records the failure situation of the corresponding fault module and transmits the fault information to the instrument for prompting.

In an embodiment, when purchasing a vehicle equipped with the above-mentioned battery pack, the user can freely choose the quantity of cell modules 12 to purchase. During daily use, if they need to increase driving range, they can consider purchasing or leasing the corresponding cell modules 12 separately.

Figure 6:
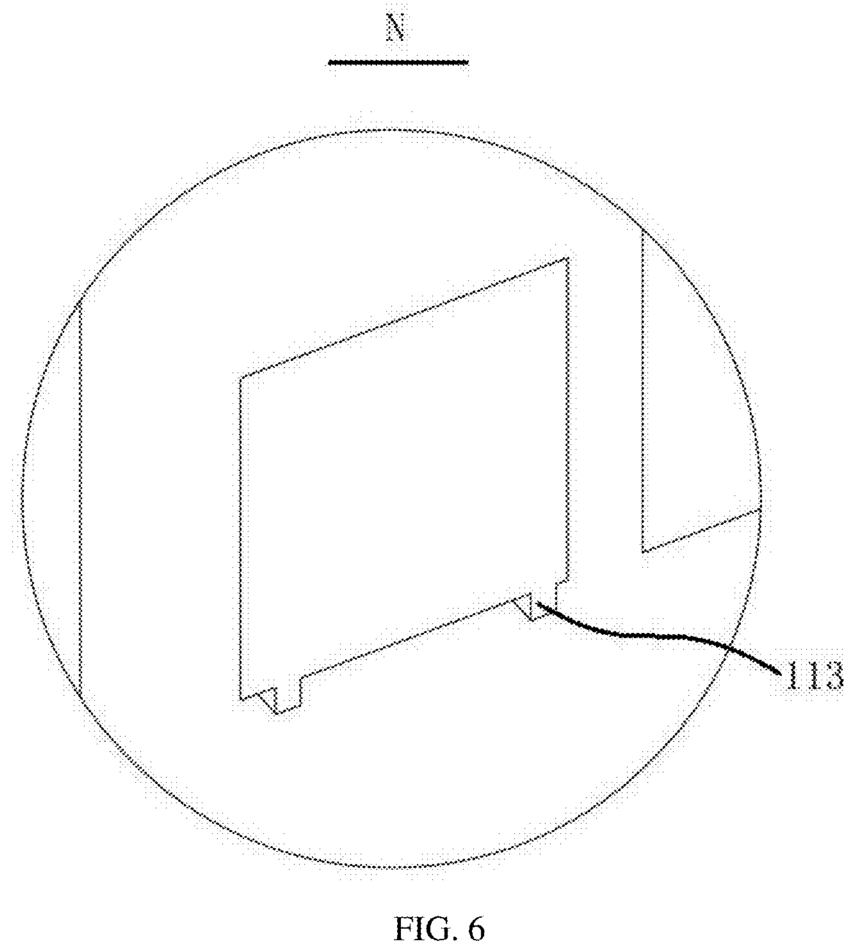
FIG. 6 is a partial enlarged view of FIG. 5.
Figure 7:
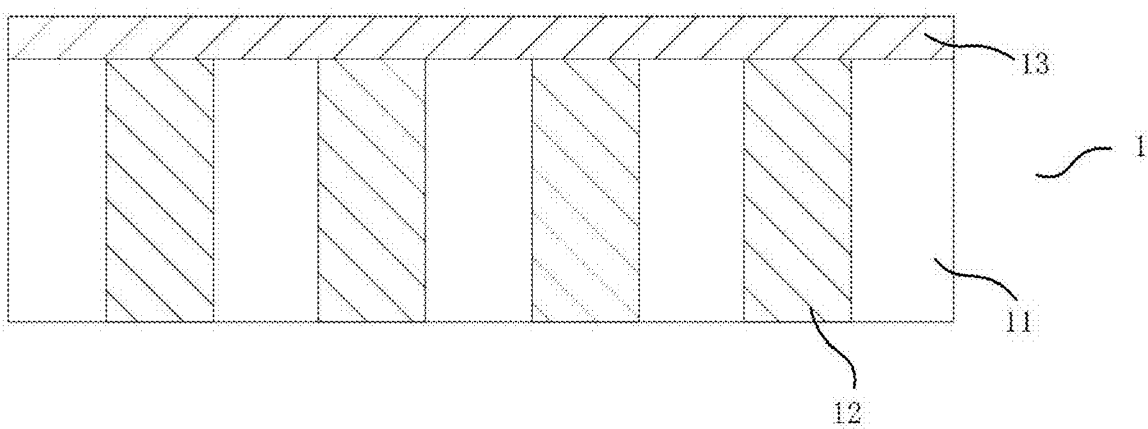
FIG. 7 is a cross-sectional view of the power freely-configurable plug-in battery pack provided by an embodiment of the present application.

In an embodiment, FIG. 5 is a schematic structural diagram of the power freely-configurable plug-in battery pack provided by an embodiment of the present application from another angle. FIG. 6 is a partial enlarged view of FIG. 5 (enlarged view at N). The installation structure of the cell module 12 shown in FIG. 2 is different from that shown in FIG. 1. In FIG. 2, the dragging mechanism 113 is integrally formed with the cell channel 111, and the dragging mechanism 113 is configured as a slide slot, and the cell module 12 is provided with a slider that cooperates with the slide slot. When the cell module 12 is installed in the cell channel 111, the slider on the cell module 12 cooperates with the slide slot on the cell channel 111 to realize the sliding installation of the cell module 12 on the cell channel 111. In an embodiment, the slide slot can be formed on any side wall of the cell channel 111. It can be understood that only an exemplary structure of the dragging mechanism 113 is shown in FIGS. 5 and 6, and is shown on part of the cell channels 111, and other cell channels 111 are not specifically shown. Although not all of the dragging mechanisms 113 are shown on the cell channel 111, it should be understood that the cell channel 111 is also provided with the dragging mechanism 113.

It can be understood that the dragging mechanism 113 and the cell channel 111 are integrally formed, which simplifies the manufacturing process of the installation structure of the cell module 12 and saves costs.

It can be understood that the above-mentioned configuration of the dragging mechanism 113 as a slide slot and providing the slider on the cell module 12 is only an example. In other embodiments, the dragging mechanism 113 can also be configured as a slider, and a slide slot is provided on the cell module 12. When the cell module 12 is installed in the cell channel 111, the slide slot on the cell module 12 cooperates with the slider on the dragging mechanism 113, so that the cell module 12 is slidably installed on the cell channel 111.

Figure 9:
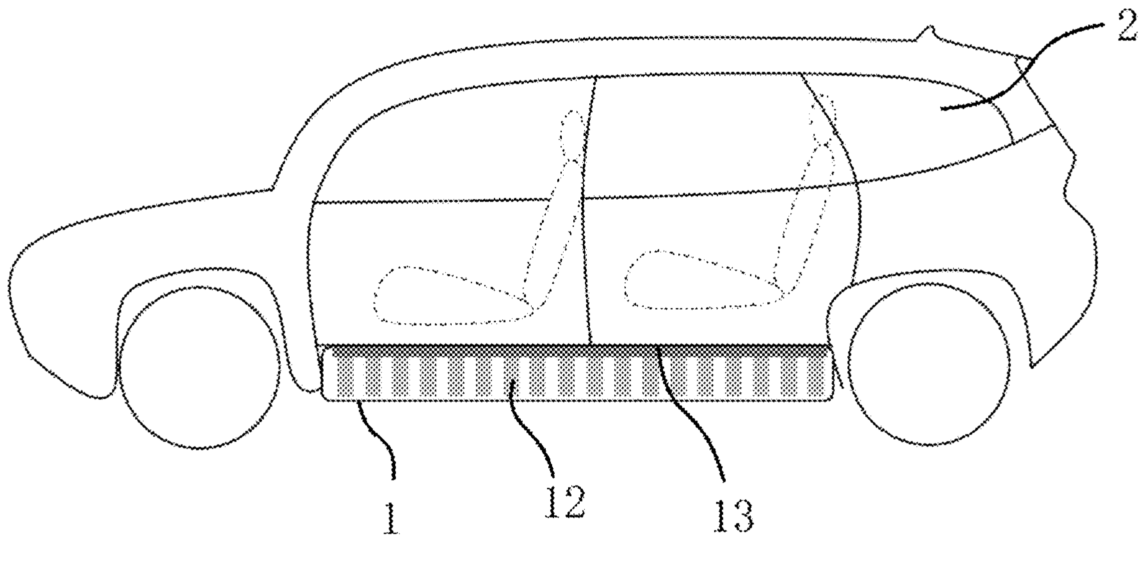
FIG. 9 is a schematic structural diagram of a battery pack power freely-configurable vehicle according to an embodiment of the present application.

In an embodiment, as shown in FIG. 9, a battery pack power freely-configurable vehicle is provided. The bottom of the vehicle 2 is provided with the power freely-configurable plug-in battery pack as shown in FIG. 1. In an embodiment, the bottom of the vehicle 2 is provided with the power freely-configurable plug-in battery pack as shown in FIG. 5. As shown in FIG. 9, the cell channel 111 is provided at the lower part of the battery pack 1 and provided with an opening downward. The cell module 12 is inserted vertically upward in the cell channel 111.

In an embodiment, the vehicle 2 also includes a voltage-to-current converter, which is electrically connected to the battery pack 1 and the motor of the vehicle 2 respectively. In an embodiment, the vehicle 2 is a new energy vehicle, which may include an electric vehicle (EV), a battery electric vehicle (BEV), or a hybrid electric vehicle (HEV).

Figure 10:
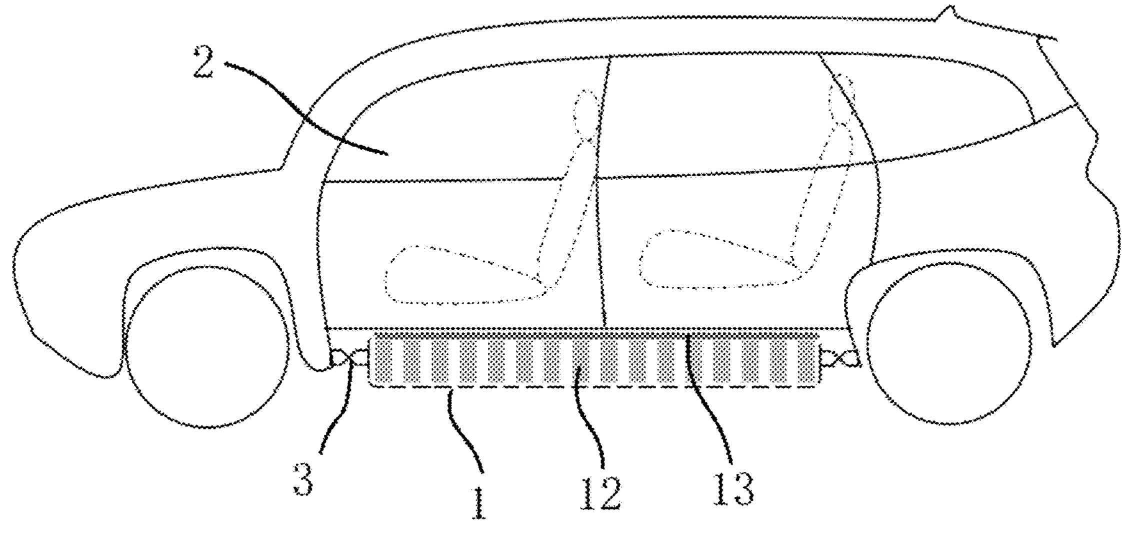
FIG. 10 is a schematic structural diagram of another battery pack power freely-configurable vehicle according to an embodiment of the present application.

In an embodiment, as shown in FIG. 10, another battery pack power freely-configurable vehicle is provided. The bottom of the vehicle 2 is provided with a body quick-replacement connector 3 and the power freely-configurable plug-in battery pack as shown in FIG. 1 or FIG. 5. The battery pack 1 and the vehicle 2 are connected through the body quick-replacement connector 3. The cell channel 111 is provided at the lower part of the battery pack 1 and provided with an opening downward. The cell module 12 is inserted vertically upward in the cell channel 111.

Figure 11:
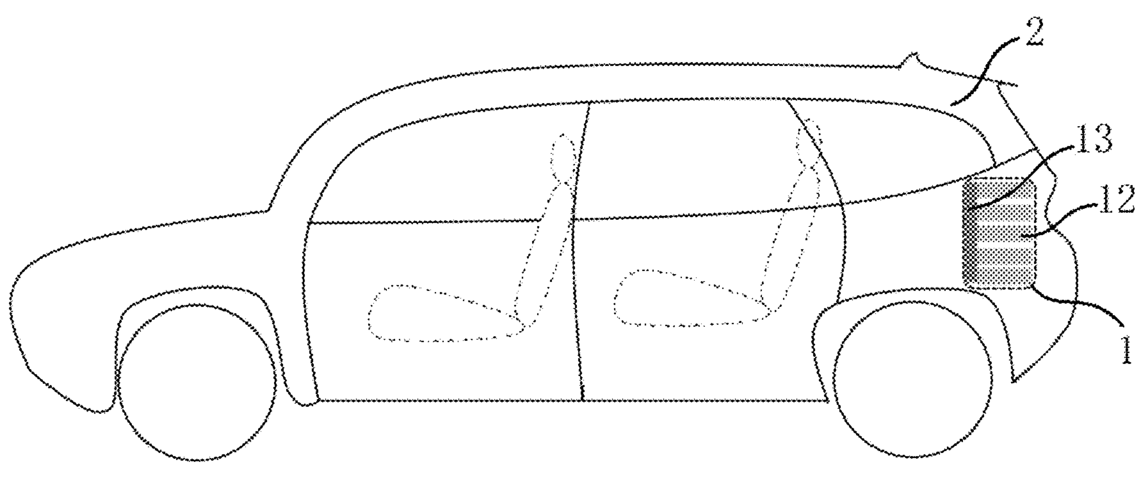
FIG. 11 is a schematic structural diagram of another battery pack power freely-configurable vehicle provided by an embodiment of the present application.

In an embodiment, as shown in FIG. 11, another battery pack power freely-configurable vehicle is provided. The power freely-configurable plug-in battery pack shown in FIG. 1 or FIG. 5 is provided in a trunk of the vehicle 2, the cell channel 111 is provided horizontally, and the cell module 12 is inserted horizontally in the cell channel 111.

Figure 12:
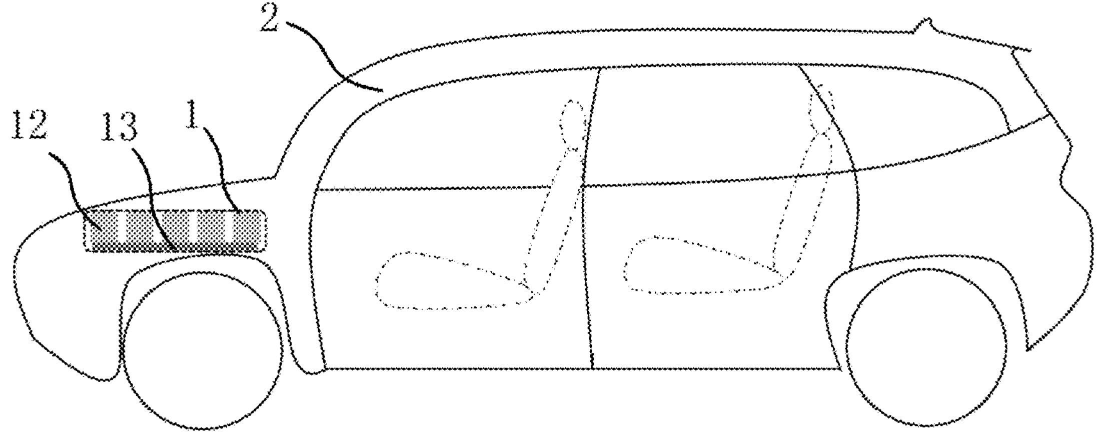
FIG. 12 is a schematic structural diagram of another battery pack power freely-configurable vehicle according to an embodiment of the present application.

In an embodiment, as shown in FIG. 12, another battery pack power freely-configurable vehicle is provided. The power freely-configurable plug-in battery pack shown in FIG. 1 or FIG. 5 is provided in a front of the vehicle 2. The cell channel 111 is provided at the upper part of the battery pack 1 and provided with an opening vertically upward. The cell module 12 is inserted vertically downward in the cell channel 111.

Figure 13:
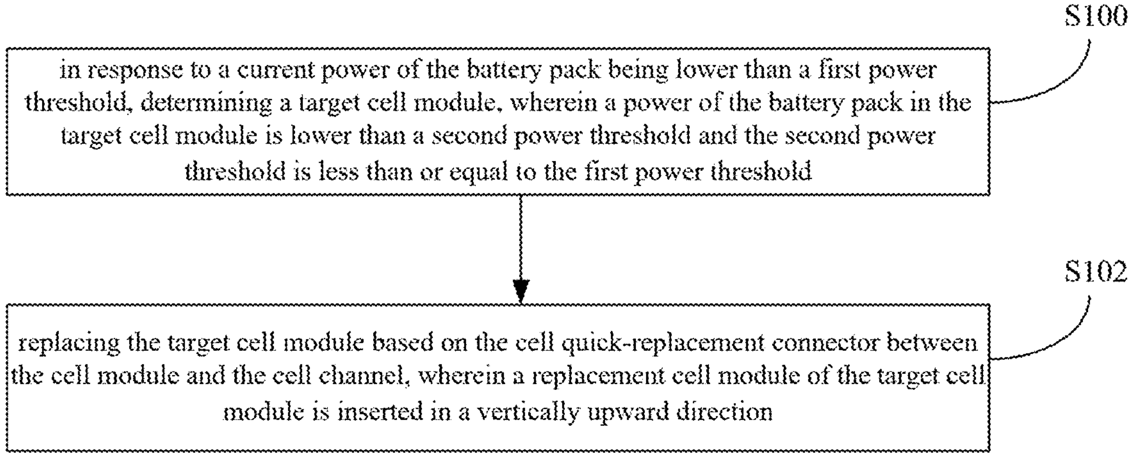
FIG. 13 is a flow chart of a battery replacement method for a vehicle with the power freely-configurable plug-in battery pack provided by an embodiment of the present application.

In an embodiment, a battery replacement method for a vehicle with the power freely-configurable plug-in battery pack is further provided. The method is applied to the vehicle shown in FIG. 9. As shown in FIG. 13, the method includes:

- S100: in response to a current power of the battery pack being lower than a first power threshold, determining a target cell module, wherein a power of the battery pack in the target cell module is lower than a second power threshold and the second power threshold is less than or equal to the first power threshold.
- S102: replacing the target cell module based on the cell quick-replacement connector between the cell module and the cell channel, wherein a replacement cell module of the target cell module is inserted in a vertically upward direction.

In an embodiment, the first power threshold may refer to the minimum allowable power of the battery pack, that is, when the current power of the battery pack is less than the first power threshold, it means that the battery pack needs to be charged or replaced at this time to prevent the vehicle from continuing to drive, which causes the battery pack to be overloaded and shortens battery life.

In an embodiment, when the current power of the battery pack is lower than the first power threshold, it may be that the power of some cell modules in the battery pack is too low. At this time, it is also possible to first determine the target cell module with too low power, and then, directly replace the target cell module with too low power. In an embodiment, when determining the target cell module, the cell module whose power in the battery pack is lower than the second power threshold can be used as the target cell module. In addition, when replacing the target cell module, it can be replaced at any time without driving the vehicle to a battery replacement station. The operation is easy and the replacing efficiency is high. In an embodiment, the cell channel is opened at the lower part of the battery pack with the opening downward. For example, as shown in FIG. 9, the battery pack 1 can be installed at the bottom of the vehicle 2. When the battery pack 1 is installed at the bottom of the vehicle 2, the opening of the cell channel 111 faces the ground. At this time, the target cell module can be replaced based on the cell quick-replacement connector between the cell module 12 and the cell channel 111. The replacement cell module of the target cell module is inserted in a vertically upward direction.

It can be understood that the second power threshold can be less than the first power threshold, or can be equal to the first power threshold. The first power threshold and the second power threshold can be provided according to actual needs, and are not specifically limited here.

According to another aspect of the present application, another battery replacement method for the vehicle with the power freely-configurable plug-in battery pack is provided. The method is applied to the vehicle shown in FIG. 10.

Figure 14:
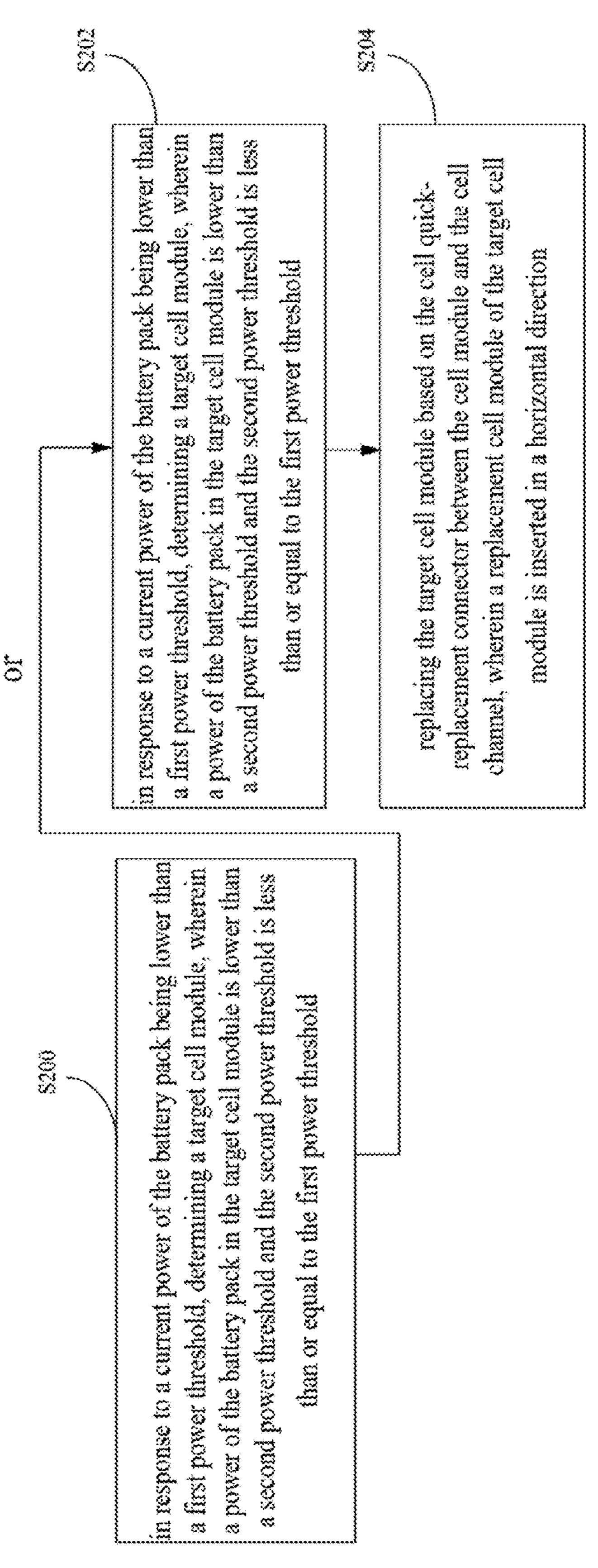
FIG. 14 is a flow chart of another battery replacement method for the vehicle with the power freely-configurable plug-in battery pack provided by an embodiment of the present application.

As shown in FIG. 14, the method includes:

- S200: in response to a current power of the battery pack being lower than a first power threshold, replacing an entire battery pack based on the body quick-replacement connector between the battery pack and the vehicle;

or,

- S202: in response to a current power of the battery pack being lower than a first power threshold, determining a target cell module, wherein a power of the battery pack in the target cell module is lower than a second power threshold and the second power threshold is less than or equal to the first power threshold;
- S204: replacing the target cell module based on the cell quick-replacement connector between the cell module and the cell channel, wherein a replacement cell module of the target cell module is inserted in a vertically upward direction.

It can be understood that the vehicle 2 shown in FIG. 10 includes a body quick-replacement connector 3, and the battery pack 1 can be detachably installed with the vehicle 2 through the body quick-replacement connector 3. In response to that the current power of the battery pack 1 is lower than the first power threshold, at this time, the battery pack 1 may need to be replaced or charged. In an embodiment, when the battery pack 1 is selected to be replaced, the battery pack 1 can be replaced as a whole. Since the vehicle 2 is provided with a body quick-replacement connector 3, the battery pack 1 and the vehicle 2 can be replaced quickly.

In an embodiment, when the current power of the battery pack is lower than the first power threshold, it may be that the power of some cell modules in the battery pack is too low. At this time, it is also possible to first determine the target cell module with too low power, and then, directly replace the target cell module with too low power. In an embodiment, when determining the target cell module, the cell module whose power in the battery pack is lower than the second power threshold can be used as the target cell module. In addition, when replacing the target cell module, it can be replaced at any time without driving the vehicle to a battery replacement station. The operation is easy and the replacing efficiency is high. In an embodiment, the cell channel is opened at the lower part of the battery pack with the opening downward. For example, as shown in FIG. 10, the battery pack 1 can be installed at the bottom of the vehicle 2. When the battery pack 1 is installed at the bottom of the vehicle 2, the opening of the cell channel 111 faces the ground. At this time, the target cell module can be replaced based on the cell quick-replacement connector between the cell module 12 and the cell channel 111. The replacement cell module of the target cell module is inserted in a vertically upward direction.

It can be understood that the second power threshold can be less than the first power threshold, or can be equal to the first power threshold. The first power threshold and the second power threshold can be provided according to actual needs, and are not specifically limited here.

Figure 15:
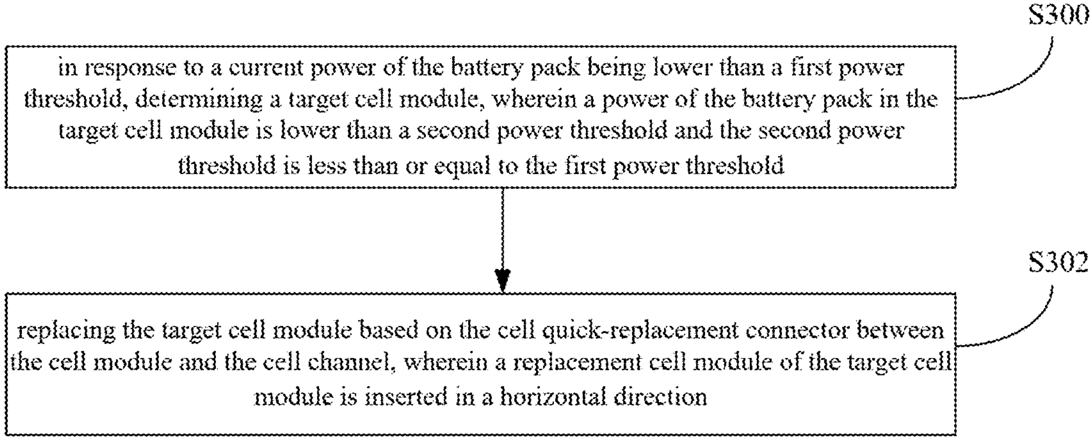
FIG. 15 is a flow chart of another battery replacement method for the vehicle with the power freely-configurable plug-in battery pack provided by an embodiment of the present application.

According to another aspect of the present application, another battery replacement method for the vehicle with the power freely-configurable plug-in battery pack is provided. The method is applied to the vehicle 2 shown in FIG. 11. As shown in FIG. 15, the method includes:

- S300: in response to a current power of the battery pack being lower than a first power threshold, determining a target cell module, wherein a power of the battery pack in the target cell module is lower than a second power threshold and the second power threshold is less than or equal to the first power threshold;
- S302: replacing the target cell module based on the cell quick-replacement connector between the cell module and the cell channel, wherein a replacement cell module of the target cell module is inserted in a horizontal direction.

It can be understood that the first power threshold may refer to the minimum allowable power of the battery pack. That is, when the current power of the battery pack is less than the first power threshold, it means that the battery pack needs to be charged or replaced at this time to prevent the vehicle from continuing to drive, which causes the battery pack to be overloaded and shortens battery life.

In an embodiment, when the current power of the battery pack is lower than the first power threshold, it may be that the power of some cell modules in the battery pack is too low. At this time, it is also possible to first determine the target cell module with too low power, and then, directly replace the target cell module with too low power. In an embodiment, when determining the target cell module, the cell module whose power in the battery pack is lower than the second power threshold can be used as the target cell module. In addition, when replacing the target cell module, it can be replaced at any time without driving the vehicle to a battery replacement station. The operation is easy and the replacing efficiency is high. In an embodiment, the cell channel is horizontally opened at the side surface of the battery pack with the opening outward. For example, as shown in FIG. 11, the battery pack 1 can be provided in the trunk of the vehicle 2. When the battery pack 1 is provided in the trunk of the vehicle 2, the opening of the cell channel 111 faces toward a side of the trunk door. At this time, the target cell module can be replaced based on the cell quick-replacement connector between the cell module 12 and the cell channel 111. The replacement cell module of the target cell module is inserted in a horizontal direction.

It can be understood that the second power threshold can be less than the first power threshold, or can be equal to the first power threshold. The first power threshold and the second power threshold can be provided according to actual needs, and are not specifically limited here.

Figure 16:
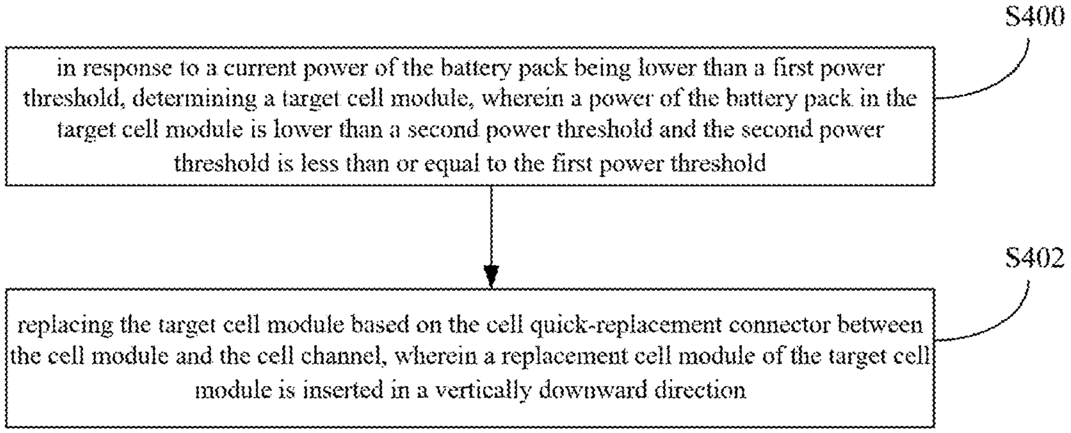
FIG. 16 is a flow chart of another battery replacement method for the vehicle with the power freely-configurable plug-in battery pack provided by an embodiment of the present application.

According to another aspect of the present application, another battery replacement method for the vehicle with the power freely-configurable plug-in battery pack is provided. The method is applied to the above-mentioned vehicle shown in FIG. 12. As shown in FIG. 16, the method includes:

- S400: in response to a current power of the battery pack being lower than a first power threshold, determining a target cell module, wherein a power of the battery pack in the target cell module is lower than a second power threshold and the second power threshold is less than or equal to the first power threshold;
- S402: replacing the target cell module based on the cell quick-replacement connector between the cell module and the cell channel, wherein a replacement cell module of the target cell module is inserted in a vertically downward direction.

It can be understood that the first power threshold may refer to the minimum allowable power of the battery pack. That is, when the current power of the battery pack is less than the first power threshold, it means that the battery pack needs to be charged or replaced at this time to prevent the vehicle from continuing to drive, which causes the battery pack to be overloaded and shortens battery life.

In an embodiment, when the current power of the battery pack is lower than the first power threshold, it may be that the power of some cell modules in the battery pack is too low. At this time, it is also possible to first determine the target cell module with too low power, and then, directly replace the target cell module with too low power. In an embodiment, when determining the target cell module, the cell module whose power in the battery pack is lower than the second power threshold can be used as the target cell module. In addition, when replacing the target cell module, it can be replaced at any time without driving the vehicle to a battery replacement station. The operation is easy and the replacing efficiency is high. In an embodiment, the cell channel is opened at the upper part of the battery pack with the opening upward. For example, as shown in FIG. 12, the battery pack 1 can be provided in the front of the vehicle 2, that is, provided in the engine compartment. In an embodiment, when the battery pack 1 is provided in the engine compartment of the vehicle 2, the opening of the cell channel 111 faces toward the engine compartment hood. At this time, the target cell module can be replaced based on the cell quick-replacement connector between the cell module 12 and the cell channel 111. The replacement cell module of the target cell module is inserted in a vertically downward direction.

It can be understood that the second power threshold can be less than the first power threshold, or can be equal to the first power threshold. The first power threshold and the second power threshold can be provided according to actual needs, and are not specifically limited here.

In the present application, by providing the cell channel 111 in the battery pack 1 and providing the cell quick-replacement connector, the cell module 12 can be quickly plugged and unplugged relative to the cell channel 111, realizing the quick replacement of the cell module 12 and improving the replacing efficiency of the battery pack 1. In addition, in the present application, when replacing the battery pack 1 on the vehicle 2, the replacement method of the battery pack 1 can be adaptively selected, and the battery pack 1 can be adaptively added or uninstalled according to the driving range, so as to meet the driving range while reducing the weight of the vehicle 2 and improving user experience.

The above are only some embodiments of the present application, and do not limit the scope of the present application thereto. Under the spirit and the concept of the present application, any modifications, equivalent substitutions and improvements made are included in the scope of the present application.

What is claimed is:

1. A power freely-configurable plug-in battery pack, comprising:

an installation box, wherein a plurality of cell channels are provided in the installation box;

a plurality of cell modules, wherein each of the plurality of cell modules is pluggably installed in a corresponding one of the plurality of cell channels, and a cell quick-replacement connector is provided between the cell module and one of the plurality of cell channels;

a controller; and a plurality of switches electrically connected to the plurality of cell modules, wherein the controller is electrically connected to the cell module through the cell quick-replacement connector and is configured to control on/off states of the plurality of switches to selectively configure the plurality of cell modules in a series connection, a parallel connection, or a series-parallel connection, based on working status information of the plurality of cell modules.

2. The power freely-configurable plug-in battery pack according to claim 1, wherein a partition is formed between the two cell channels, the partition is provided with a flow channel, and wiring harnesses and/or pipelines are provided in the flow channel.

3. The power freely-configurable plug-in battery pack according to claim 2, wherein the installation box is further provided with a locking mechanism, and the locking mechanism is configured to limit and lock the cell module in the cell channel or to release and unlock of the cell module in the cell channel.

4. The power freely-configurable plug-in battery pack according to claim 3, wherein the locking mechanism is provided on the partition.

5. The power freely-configurable plug-in battery pack according to claim 4, wherein the cell channel is configured as a slot structure, and a bottom of the slot structure is provided close to the controller.

6. The power freely-configurable plug-in battery pack according to claim 5, wherein a dragging mechanism is provided in each cell channel, the dragging mechanism is configured to drag the cell module, and the cell module is detachably installed in the cell channel through the dragging mechanism.

7. The power freely-configurable plug-in battery pack according to claim 6, wherein the dragging mechanism is provided with a pull-out piece.

8. The power freely-configurable plug-in battery pack according to claim 7, wherein a vehicle further comprises a voltage-to-current converter electrically connected to the battery pack and a motor of the vehicle respectively.

9. The power freely-configurable plug-in battery pack according to claim 8, wherein the vehicle is a new energy vehicle, and is one of an electric vehicle (EV), a battery electric vehicle (BEV), and a hybrid electric vehicle (HEV).

10. A battery pack power freely-configurable vehicle, wherein the power freely-configurable plug-in battery pack according to claim 1 is provided at a bottom of the vehicle, the cell channel is provided at a lower part of the battery pack and provided with an opening downward, and the cell module is inserted vertically upward in the cell channel.

11. A battery replacement method for a vehicle with a power freely-configurable plug-in battery pack, applicable to the battery pack power freely-configurable vehicle according to claim 10, comprising:

in response to a current power of the battery pack being lower than a first power threshold, determining a target cell module, wherein a power of the battery pack in the target cell module is lower than a second power threshold and the second power threshold is less than or equal to the first power threshold; and replacing the target cell module based on the cell quick-replacement connector between the cell module and the cell channel, wherein a replacement cell module of the target cell module is inserted in a vertically upward direction.

12. A battery pack power freely-configurable vehicle, wherein a body quick-replacement connector and the power freely-configurable plug-in battery pack according to claim 1 are provided at a bottom of the vehicle, the battery pack and the vehicle are connected through the body quick-replacement connector, the cell channel is provided at a lower part of the battery pack and provided with an opening downward, and the cell module is inserted vertically upward in the cell channel.

13. A battery replacement method for the vehicle with the power freely-configurable plug-in battery pack, applicable to the battery pack power freely-configurable vehicle according to claim 12, comprising:

in response to a current power of the battery pack being lower than a first power threshold, replacing an entire battery pack based on the body quick-replacement connector between the battery pack and the vehicle.

14. A battery replacement method for the vehicle with the power freely-configurable plug-in battery pack, applicable to the battery pack power freely-configurable vehicle according to claim 12, comprising:

in response to a current power of the battery pack being lower than a first power threshold, determining a target cell module, wherein a power of the battery pack in the target cell module is lower than a second power threshold and the second power threshold is less than or equal to the first power threshold; and replacing the target cell module based on the cell quick-replacement connector between the cell module and the cell channel, wherein a replacement cell module of the target cell module is inserted in a vertically upward direction.

15. A battery pack power freely-configurable vehicle, wherein a power freely-configurable plug-in battery pack according to claim 1 is provided in a trunk of the vehicle, the cell channel is provided horizontally, and the cell module is inserted horizontally in the cell channel.

16. A battery replacement method for a vehicle with a power freely-configurable plug-in battery pack, applicable to the battery pack power freely-configurable vehicle according to claim 15, comprising:

in response to a current power of the battery pack being lower than a first power threshold, determining a target cell module, wherein a power of the battery pack in the target cell module is lower than a second power threshold and the second power threshold is less than or equal to the first power threshold; and replacing the target cell module based on the cell quick-replacement connector between the cell module and the cell channel, wherein a replacement cell module of the target cell module is inserted in a horizontal direction.

17. A battery pack power freely-configurable vehicle, wherein a power freely-configurable plug-in battery pack according to claim 1 is provided in a front of the vehicle, the cell channel is provided on an upper part of the battery pack and provided with an opening vertically upward, and the cell module is inserted vertically downward in the cell channel.

18. A battery replacement method for a vehicle with a power freely-configurable plug-in battery pack, applicable to the battery pack power freely-configurable vehicle according to claim 17, comprising:

in response to a current power of the battery pack being lower than a first power threshold, determining a target cell module, wherein a power of the battery pack in the target cell module is lower than a second power threshold and the second power threshold is less than or equal to the first power threshold; and replacing the target cell module based on the cell quick-replacement connector between the cell module and the cell channel, wherein a replacement cell module of the target cell module is inserted in a vertically downward direction.

* * * * *